United States Patent
Shiraishi

(10) Patent No.: US 12,494,075 B2
(45) Date of Patent: Dec. 9, 2025

(54) INFORMATION PROCESSING APPARATUS FOR DISPLAYING SCREEN FOR INPUTTING PROPERTY INFORMATION, INFORMATION PROCESSING METHOD, AND STORAGE MEDIUM

(71) Applicant: CANON KABUSHIKI KAISHA, Tokyo (JP)

(72) Inventor: Kenichi Shiraishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 18/311,843

(22) Filed: May 3, 2023

(65) Prior Publication Data

US 2023/0368555 A1 Nov. 16, 2023

(30) Foreign Application Priority Data

May 16, 2022 (JP) .................................. 2022-080307

(51) Int. Cl.
G06V 30/26 (2022.01)
G06F 40/174 (2020.01)

(52) U.S. Cl.
CPC ............ *G06V 30/26* (2022.01); *G06F 40/174* (2020.01)

(58) Field of Classification Search
None
See application file for complete search history.

(56) References Cited

U.S. PATENT DOCUMENTS

| 11,303,769 B2 | 4/2022 | Shiraishi | H04N 1/00 |
| 11,463,594 B2 | 10/2022 | Shiraishi | H04N 1/00 |
| 2021/0105380 A1* | 4/2021 | Nakamura | H04N 1/0035 |
| 2021/0227083 A1* | 7/2021 | Shiraishi | H04N 1/00461 |

FOREIGN PATENT DOCUMENTS

JP H05-151258 6/1993

* cited by examiner

*Primary Examiner* — Andrew H Lam
(74) *Attorney, Agent, or Firm* — Venable LLP

(57) ABSTRACT

The user interface screen for inputting property information on a scanned image includes an input field to which information is input automatically based on results of character recognition processing performed for a character area included within the scanned image and in a case where the results of the character recognition processing are a numerical value, information that is input automatically to the input field is a numerical value after the numerical value of the results of the character recognition processing is changed in accordance with a predetermined interpretation rule of numerical value representation.

13 Claims, 13 Drawing Sheets

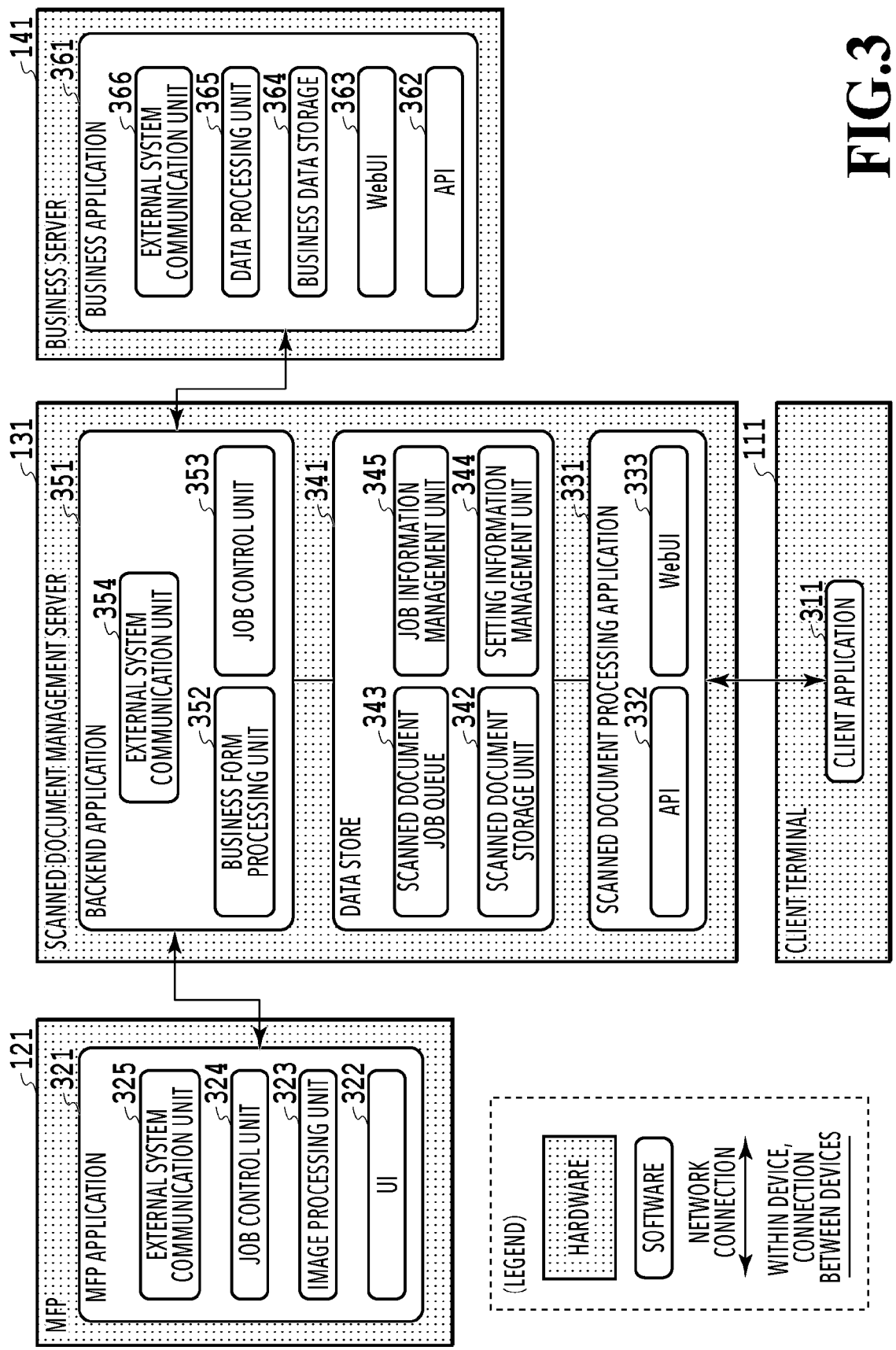

FIG.5

Japan, USA, UK, China

Germany, Italy, Spain

Other Reference

Preview
Please select any metadata first in Metadata pane.

PURCHASE ORDER

Date: 11/27/2019

Company Name : XYZ Corporation

Address : 1 Pumpkin Road, New York, NY

Phone : (123)456-7890

Total Quantity : 25

Total Price($) : 2,150.00  ← 901

921

911 →  ⋯

Use comma as decimal separator
Toggle between dot or comma separator
for numeric value recognition

☐  922

Date  [ Please select an OCR region. + ]

MetaData  Company Name  [ + ]

Currency  2,150.00
2150

[ Register ]
[ Cancel ]

931

961

Register

Cancel

Please select
an OCR region.

+

Please select
an OCR region.

+

Date

MetaData

Company Name

Currency 2.150,00

2

Use comma as decimal separator
Toggle between dot or comma separator
for numeric value recognition

☑

951

Preview:
Please select any metadata first in Metadata pane.

Bestellung

Datum: 27.November 2019

. . . .

Gesamtbetrag(€)  2.150,00

INFORMATION PROCESSING APPARATUS FOR DISPLAYING SCREEN FOR INPUTTING PROPERTY INFORMATION, INFORMATION PROCESSING METHOD, AND STORAGE MEDIUM

BACKGROUND

Field

The present disclosure relates to a technique to edit property information in a case where a document is filed.

Description of the Related Art

Conventionally, there is a document management system that scans a document, such as a business form, extracts text information described on the document by performing OCR processing for an obtained scanned image, and generates a file name and the like by using text information corresponding to a specific item. In a business form, such as an estimate form and a bill, numerical number information, such as a money amount, is included, but the notation of the numerical value may vary depending on areas (countries) and languages. For example, in a case where the decimal point is expressed, in Japan and US, a dot "." is used usually, but in Germany or France, a comma "," is used usually. In a case where the notation of a numerical value is different depending on the business form such as this, it is not possible to correctly process data in the document management system.

On the other hand, Japanese Patent Laid-Open No. H05-151258 has disclosed a technique to convert the numerical value representation included within a document in the original language into the numerical value representation in the target language. However, with this method, in a case of translating a document, it is necessary for a user to set the conversion rule in accordance with the numerical value representation in a processing-target document. The work such as this is burdensome for a user.

SUMMARY

The information processing apparatus according to the present disclosure is an information processing apparatus including: one or more memories storing instructions; and one or more processors executing the instructions to: display a user interface screen for inputting property information on a scanned image; and receive a user operation via the user interface screen, wherein the user interface screen includes an input field to which information is input automatically based on results of character recognition processing performed for a character area included within the scanned image and in a case where the results of the character recognition processing are a numerical value, information that is input automatically to the input field is a numerical value after the numerical value of the results of the character recognition processing is changed in accordance with a predetermined interpretation rule of numerical value representation.

Further features of the present disclosure will become apparent from the following description of exemplary embodiments with reference to the attached drawings.

BRIEF DESCRIPTION OF THE DRAWINGS

FIG. 3 is a diagram showing an example of a software configuration of the document management system;

FIG. 5 is a diagram showing a state where a user selects an OCR area on the property setting screen;

FIG. 8A to FIG. 8C are each a diagram showing a specific example in which numerical value representation is different depending on areas (countries) and languages;

FIG. 9 is a diagram explaining a setting dialog for changing setting of an interpretation rule of numerical value representation;

FIG. 10 is a diagram explaining a specific example in which the setting of the interpretation rule of numerical value representation is changed by the setting dialog;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<System Configuration>

Figure 1:
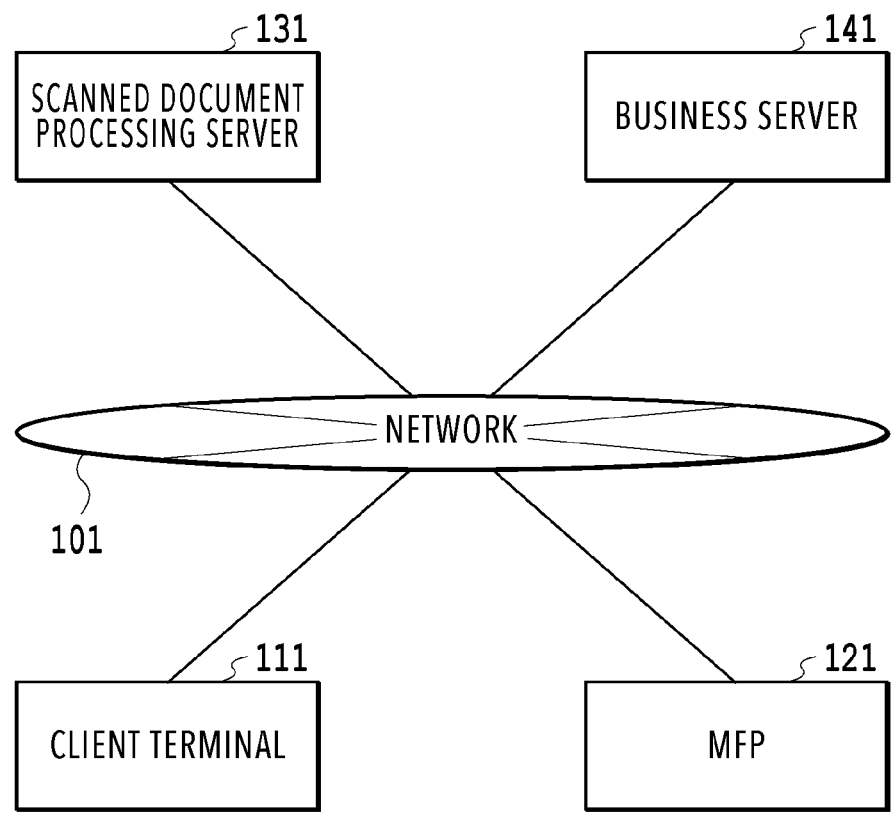
FIG. 1 is a diagram showing a configuration example of a document management system.

FIG. 1 is a diagram showing a configuration example of a document management system according to the present embodiment. The document management system includes a client terminal 111, an MFP 121, a scanned document processing server 131, and a business server 141 and each is connected to one another via a network 101, such as the internet and intranet.

The client terminal 111 is an information processing apparatus that each user utilizes, such as a personal computer, a laptop computer, a tablet computer, and a smartphone. The MFP (Multi Function Peripheral) 121 is an image processing apparatus having a plurality of functions, such as the function as a scanner and the function as a printer, and is used by a user to generate image data by scanning a document, such as a business form. The scanned document processing server 131 is a server having various document processing functions, such as the function to receive a document scanned image from the MFP 121 and file, store, and transfer it to a cloud storage service and the like. The business server 141 is a server that provides a cloud storage service to manage a document file transferred from the scanned document processing server 131. It may also be possible for the business server 141 to provide another business application, for example, such as transmission of a received document file by attaching it to a mail.

<Hardware Configuration>

Figure 2:
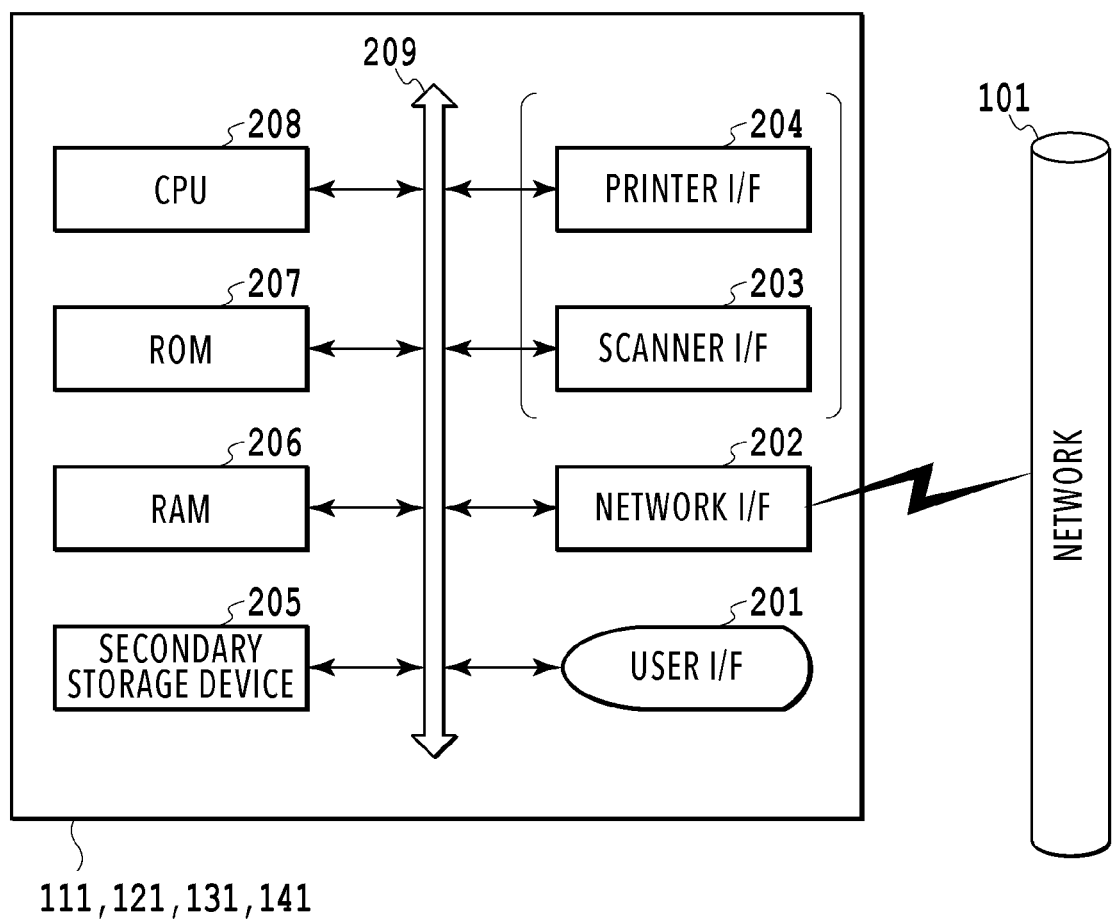
FIG. 2 is an information processing function hardware configuration diagram.

FIG. 2 is a diagram showing an example of the hardware configuration that implements the function of each of the information processing apparatuses, such as the client terminal 111, the MFP 121, the scanned document processing server 131, and the business server 141. A user I/F 201 is an input/output device of a display, a keyboard, a mouse, a button, a touch panel and the like for providing necessary information to a user or for a user to input information. It is also possible for another computer to connect to and operate even an information processing apparatus whose configuration does not comprise these devices by a remote desktop, a remote shell and the like. A network I/F 202 connects to a network, such as a LAN, and communicates with another device. As the communication method, any of wired communication and wireless communication may be used. A scanner I/F 203 and a printer I/F 204 are interfaces of the MFP 121 and control input/output with a scanner and a printer, respectively. A secondary storage device 205 is a large-capacity storage device represented by an HDD and a flash memory. A RAM 206 is a volatile memory temporarily storing results of computing processing and the like. A ROM 207 is a nonvolatile memory storing incorporated programs, data that does not need to be changed, and the like. A CPU 208 is a computing processing device that executes programs read from the secondary storage device 205, the RAM 206, the ROM 207 and the like. The various interfaces and storage devices are configured so as to be capable of performing transmission and reception of data with one another via a system bus 209.

<Software Configuration>

FIG. 3 is a diagram showing an example of the software configuration of the document management system according to the present embodiment. Predetermined functions are implemented by each CPU 208 executing software installed in each of the client terminal 111, the MFP 121, the scanned document processing server 131, and the business server 141.

<<Software Configuration of Client Terminal>>

A client application 311 performs a Web application of a scanned document processing application 331, to be described later. As one of aspects of the provision of the client application 311, there is a method of displaying a WebUI 333 by a browser, performing transmission and reception of necessary data with an API 332, and executing the Web application. Alternatively, the client application 311 may be a device application of, for example, such as a smartphone, which is configured to perform transmission and reception of necessary data with the API 332.

<<Software Configuration of MFP>>

An MFP application 321 is, in the present embodiment, a scan application that transmits a scanned image obtained by scanning a document to the scanned document processing server 131. A UI 322 is a user interface provided by the MFP application 321 and implements instructions to edit various settings applied to the scanned image, perform a scan, and the like. An image processing unit 323 generates a document file in a predetermined format, such as JPEG and PDF, from the image data obtained by performing a scan. A job control unit 324 issues a job of image data obtained by performing a scan in accordance with the setting designated via the UI 322, and so on. An external system communication unit 325 performs transmission of an authentication request for connecting with the scanned document processing server 131, transmission of a document processing request including setting information applied to the scanned image and the like as parameters, a response analysis of the request, and so on.

<<Software Configuration of Scanned Document Processing Server>>

The scanned document processing application 331 is explained as a Web application in the present embodiment, but may be another application implementation. The API 332 is an application/programming interface provided by the scanned document processing application 331. The WebUI 333 is a user interface for performing the setting of an application and a server from a Web browser provided by the scanned document processing application 331.

A data store 341 is a storage area used by the scanned document processing application 331 or a backend application 351, to be described later. The data store 341 includes a scanned document storage unit 342, a scanned document job queue 343, a setting information management unit 344, and a job information management unit 345. The scanned document storage unit 342 stores image data obtained by scanning a document as a document file in a predetermined format, such as JPEG and PDF. The scanned document job queue 343 holds a queue for managing jobs waiting for processing. For simplification of explanation, explanation is given with a single queue, but it may also be possible to provide a plurality of queues depending on priority of a schedule or contents of processing. The setting information management unit 344 manages setting information that is used at the time of a scan, account information necessary for cooperation with the scanned document processing server 131 and the business server 141, and further, setting information on the interpretation rule of numerical value representation, to be described later, in association with a user. In addition, the setting information management unit 344 also manages the setting of the entire scanned document processing server. The OCR area job information management unit 345 manages detailed information and data, such as the processing situation and the date of registration for each job, setting information and OCR area information associated with a job, and learning data.

The backend application 351 is in charge of background processing and includes a business form processing unit 352, a job control unit 353, and an external system communication unit 354. The business form processing unit 352 performs control of a job in the data store 341 and image processing (document processing) planned for a scanned image. Here, in the document processing, similar business form determination using pattern recognition and machine learning, named entity extraction and the like are included, in addition to character recognition processing (OCR) and document division for a scanned image obtained from the scanned document storage unit 342. The job control unit 353 checks the situation of a job in the backend application 351 or the processing situation of the scanned document processing server 131 and the business server 141 and performs processing in accordance with each status. The external system communication unit 354 performs processing relating to transmission and reception, such as reception of a job and a request that are transmitted, transmission of a request for data processing, and analysis of its response.

<<Software Configuration of Business Server>>

A business application 361 is explained as a Web application in the present embodiment, but may be another application implementation. An API 362 is an application/programming interface provided by the business application 361. A WebUI 363 is a user interface for performing setting of an application and a server from a Web browser provided by the business application 361.

A business data storage 364 is a storage area storing data used by the business application 361. A data processing unit 365 performs a variety of processing designated by a user via the scanned document processing server 131 and the client application 311 by utilizing information on files and folders stored in the business data storage 364.

An external system communication unit 366 performs processing relating to transmission and reception, such as processing to analyze a request received from the scanned document processing server 131 and transmit processing results thereof as a response.

The above is the software configuration of the document management system according to the present embodiment. For simplification of explanation, for the client terminal 111, the MFP 121, and the business server 141, the functions are integrated into one application, but it may also be possible to provide a backend application and a data store as in the case of the scanned document processing server 131. Further, in the present embodiment, the one or more business servers 141 that cooperate with the scanned document processing server 131 are provided, but for example, the scanned document processing server 131 may also have the function of the business server 141. Furthermore, a configuration may be accepted in which the WebUI 333 is displayed on the MFP application 321. In a case of this configuration, the client application 311 may be omitted.

<Property Setting UI>

Figures 4A, 4B:
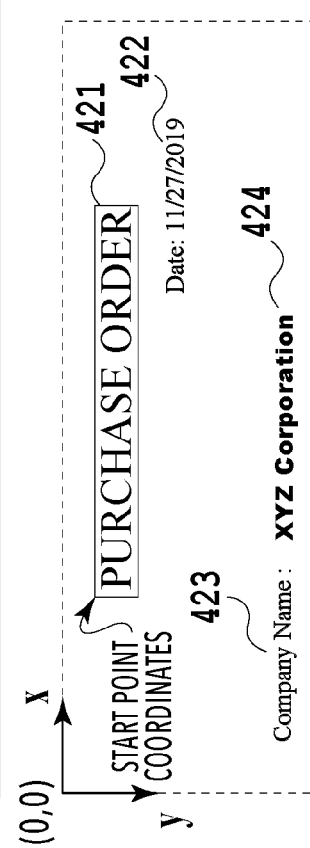
FIG. 4A is a diagram showing an example of a property setting screen and FIG. 4B is a diagram explaining a relationship between a preview page image and an OCR area.

FIG. 4A is a diagram showing an example of a user interface screen (UI screen) on which to perform setting of information necessary for automatically generating property information by using OCR results (recognized character string) extracted from a scanned image. In the following, this UI screen is called "property setting screen". In a case of the present embodiment, the display of the property setting screen such as this is controlled by the client application 311 and a user inputs, edits, and sets necessary information in the client terminal 111, and so on. The property setting screen in FIG. 4A has a two-pane configuration of a preview pane 401 and a setting information editing pane 411. In the preview pane 401, a processing-target scanned image is displayed for each page. In the following, a scanned image 402 corresponding to one page, which is displayed within the preview pane 401, is called "preview page image". In the preview pane 401, it is possible to display any position by scrolling and zooming the displayed preview page image 402. The setting information editing pane 411 is a pane for displaying and editing the setting information (indicating which item's character string within a document is used, an OCR area for extracting the character string, and the like) for automatically generating property information in accordance with the type of the scanned document. Here, in the setting information editing pane 411, two small panes exist, that is, a "File Name" pane and a "Metadata" pane. Processing to determine the type of a document (here, business form) corresponding to the processing-target scanned image is generally called business form determination processing. In this example, in a case where the business form type corresponding to the scanned image is determined to be "PURCHASE ORDER", "File-Name" and "Metadata" are generated automatically as property information thereon. Then, as regards "FileName", the setting is made to use recognized character strings corresponding to two setting items "Customer Name" and "Date". Further, as regards "Metadata", the setting is made to use recognized character strings corresponding to "Company Name" and "Currency".

FIG. 4B is an explanatory diagram showing a relationship between the preview page image 402 and the OCR area in an orthogonal coordinate system. Here, as character areas (OCR areas) obtained by preprocessing (generally called block selection processing) of the OCR processing, four areas 421, 422, 423, and 424 exist. In the preview page image 402 in FIG. 4A, OCR areas other than these four OCR areas exist, but they are omitted here. Each individual OCR area is specified by information on start point coordinates, width, and height and distinguished from the other OCR areas. For example, the OCR area 421 enclosed by a rectangle is represented as start point coordinates "(1200, 700)", width "720", and height "120" in units of pixels.

Figure 5:
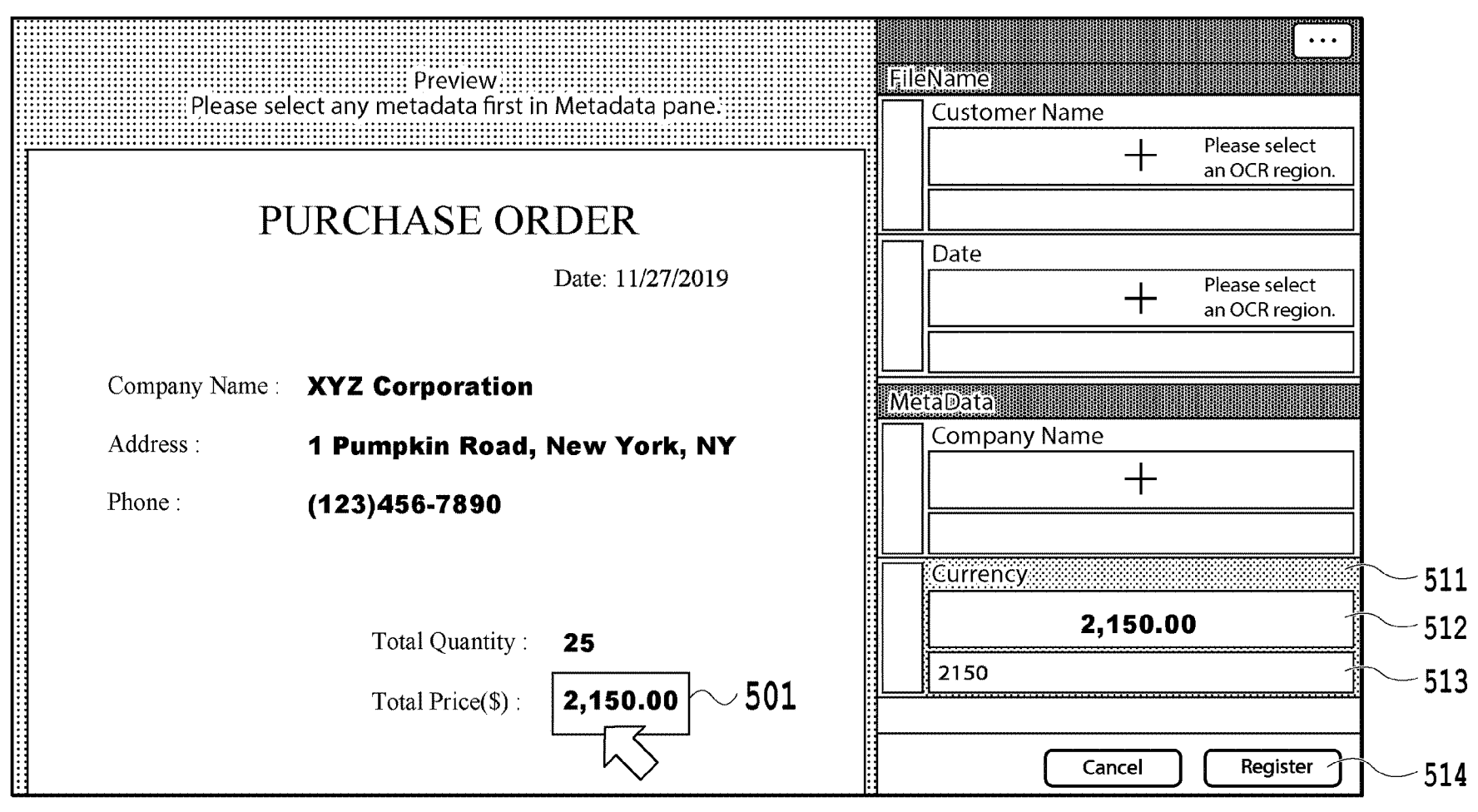

FIG. 5 is a diagram showing the state where a user has selected an arbitrary OCR area on the property setting screen in FIG. 4A. Here, an OCR area 501 enclosed by a rectangle within the property setting screen represents the selected OCR area. Then, it is represented that a setting item "Currency" 511 highlighted within the setting information editing pane is currently selected. Then, within the setting item 511, a partial image display area 512 exists, which displays an image (partial image cut out from preview page image) corresponding to the selected OCR area 501 and here, the partial image obtained by cutting out the money amount "2,1500.00" in dollar is displayed. For the other setting items, a "+" button is displayed, which indicates that association with the OCR area is not designated yet. Then, a field 513 within the setting item 511 is a field to input the value corresponding to the setting item "Currency" 511 and further, in the present embodiment, it is assumed that the value is defined so that only whose whole number part is displayed by the fractional part thereof being rounded down. Furthermore, in a case where the OCR area 501 is designated by a user, it is assumed that the recognized character string corresponding to the character recognition results of the OCR area 501 is displayed in the field 513 in the state where the fractional part thereof is rounded down. Consequently, in FIG. 5, as the numerical value corresponding to the money amount "2,150.00" in dollar in the OCR area 501, a four-digit number "2150" is displayed (automatically input) in the field 513. This means that ". (dot)" is predefined as the numerical value notation representing the decimal point and ", (comma)" is predefined as the numerical value notation representing the digit delimiter, respectively, in the setting of the interpretation rule of numerical value representation, to be described later. In a case of completing check, input and editing of the necessary information, a user presses down a "Register" button 514. Due to this, for each setting item, a file name and metadata are generated automatically in accordance with input and edited contents. Further, it is made possible to transmit the file name and metadata automatically generated to, for example, the business application 361 along with the processing-target scanned image data. Further, in a case where an arbitrary OCR area is selected and the setting is made, information associating the selected OCR area and the specific setting item is registered in the job information management unit 345 in association with the document type of the processing-target scanned image.

<UI Control Processing>

Figure 6:
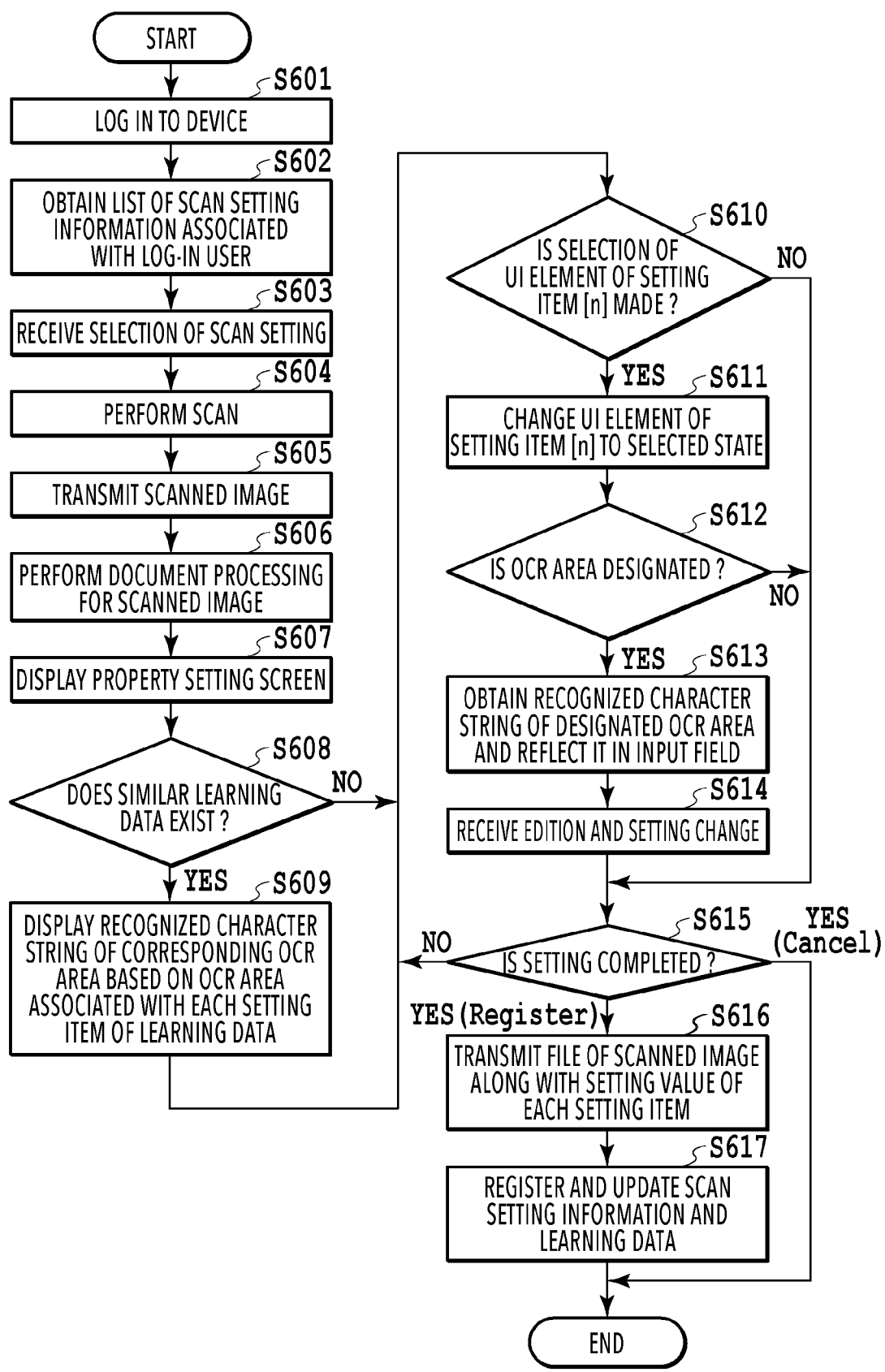
FIG. 6 is a flowchart showing a flow of processing in the document management system.

FIG. 6 is a flowchart showing a flow of processing in the document management system according to the present embodiment, with the display control of the property setting screen shown in FIG. 4A, FIG. 4B, and FIG. 5 being focused on. In the present embodiment, it is assumed that as the interpretation rule of numerical value representation described previously, ". (dot)" is set in advance (default setting) as the numerical value notation representing the decimal point and ", (comma)" is set in advance (default setting) as the numerical value notation representing the digit delimiter, respectively. In the following explanation, a symbol "S" means a step.

First, at S601, a user logs in to the document management system from the MFP 121. Specifically, the MFP application 321 displays a log-in screen, not shown schematically, on the UI 322 and performs log-in processing to prompt a user to input information (user ID, password and the like) for logging in to the scanned document processing server 131. The log-in method may be any method, such as a method in which log-in information is held in advance within the MFP 121 and a method of associating the log-in information to the scanned document processing server 131 with the log-in information on the MFP 121 itself.

At S602, the MFP application 321 of the MFP 121 obtains a list of scan setting information associated with the log-in user from the setting information management unit 344 of the scanned document processing server 131 via the external system communication unit 325.

At S603, the MFP application 321 of the MFP 121 presents the list of scan setting information obtained at S602 on the UI 322 and receives a user selection relating to the scan setting.

At S604, the MFP application 321 of the MFP 121 applies the scan setting selected by a user and performs scan processing for a document that is set on a document table or the like, not shown schematically.

At S605, the MFP application 321 of the MFP 121 transmits data of the scanned image generated in the scan processing at S604 to the scanned document processing server 131. Specifically, after being converted into a predetermined format in the image processing unit 323, the data is transmitted through the external system communication unit 325 along with the processing request (job) to the scanned document processing server 131, which is created by the job control unit 324.

At S606, the scanned document processing server 131 performs document processing for the scanned image in accordance with the received job. Specifically, in a case where the external system communication unit 354 receives a job, the business form processing unit 352 performs OCR processing and the like for the scanned image according to the job and stores the scanned image in the data store 341 in association with the OCR results and the like. Further, in a case where there is learning data similar to the scanned image of this time in the learning data (data stored and registered by associating setting information and the like at the time of processing with the processed scanned image) of the scanned image processed in the past, association with the OCR area registered in the learning data is also performed.

At S607 after the document processing is completed, in the client terminal 111, the client application 311 displays the property setting screen described previously. On this property setting screen, the processing-target scanned image obtained at S604 is displayed within the preview pane 401 along with the above-described OCR area associated as the preview page image. Further, information on the setting item and the like for generating property information, which is included in the job, is displayed in the setting information editing pane 411.

At S608, the processing is branched in accordance with whether learning data similar to the processing-target scanned image exists. In a case where similar learning data exists, the processing advances to S609 and based on the information on the OCR area associated with the learning data, the recognized character string extracted from the corresponding OCR area is input automatically as the value corresponding to the relevant setting item. At this time, for example, in a case where the setting item is the total money amount and a numerical value is input as the value thereof, the recognized character string is changed in accordance with the setting of the interpretation rule of numerical value representation, which is registered in association with the learning data, and the numerical value obtained by changing the recognized character string is input automatically to the input field corresponding to the setting item. The setting of the interpretation rule of numerical value representation and the numerical value automatic input in accordance with the interpretation rule will be described later. On the other hand, in a case whether similar learning data does not exist, the processing advances to S610. On the property setting screen shown in FIG. 4A described previously, the input fields of all the setting items are blank and this means that the property setting screen indicates the state of the property setting screen in a case where similar learning data does not exist.

At S610, the processing is branched in accordance with the presence/absence of the user operation for the UI element in one of the setting items in the setting information editing pane 411. Specifically, in a case where a user performs the click operation for the "+" button displayed in the partial image display area within each setting item, the client application 351 detects the click event for the UI element of a setting item [n]. In a case where this click event is detected within a predetermined time, the processing advances to S611 and in a case where the click event is not detected, the processing to S615.

At S611, he UI element for which the click event has been detected is highlighted. Due to this, it is possible for a user to easily grasp the UI element currently selected. Specifically, processing to fill in the background of the partial image display area within the setting item selected by a user with a different color, processing to fringe the outer frame of the partial image display area with a thick line, or the like is performed.

At S612, the processing is branched in accordance with the presence/absence of designation of a user for one of OCR areas within the preview page screen displayed in the preview pane 401. Specifically, in a case where a user performs the click operation for one of OCR areas, the client application 311 detects the click event for the OCR area. In a case where this click event is detected within a predetermined time, the processing advances to S613 and in a case where this click event is not detected, the processing advances to S615.

At S613, the client application 311 obtains information (information on start point coordinates, width, height) on the OCR area designated by a user and a recognized character string corresponding to the OCR area and displays (automatically inputs) the recognized character string in the input field of the setting item being selected by a user. At this time, in a case where the setting contents of the interpretation rule of numerical value representation described previously do not match the numerical value representation of the scanned business form, a number whose number of digits is erroneous will be displayed in the input field. Details of a method for addressing this will be described later.

At S614, the client application 311 receives the user operation, such as the operation to edit the character string that is displayed in the input field at S613 and the processing to change the various settings. By the processing so far, the property setting screen enters the state as shown in FIG. 5 described previously.

At S615, whether to terminate the setting work on the property setting screen is determined. Specifically, in a case where a "Cancel" button or a "Register" button within the property setting screen is pressed down within a predetermined time, it is determined that the setting work is completed and the next processing is determined in accordance with the type of the button that is pressed down. That is, in a case where the pressed-down button is the "Register" button, the processing advances to S616. On the other hand, in a case where the pressed-down button is the "Cancel" button, this processing is terminated. Further, in a case where pressing down of the "Register" button or the "Cancel" button is not detected with the predetermined time, the processing returns to S610.

At S616, the external system communication unit 354 of the scanned document processing server 131 transmits the file of the processing-target scanned image to the business server 141 along with the information on the value of each setting item at the point in time at which the "Register" button is pressed down.

Figure 7:
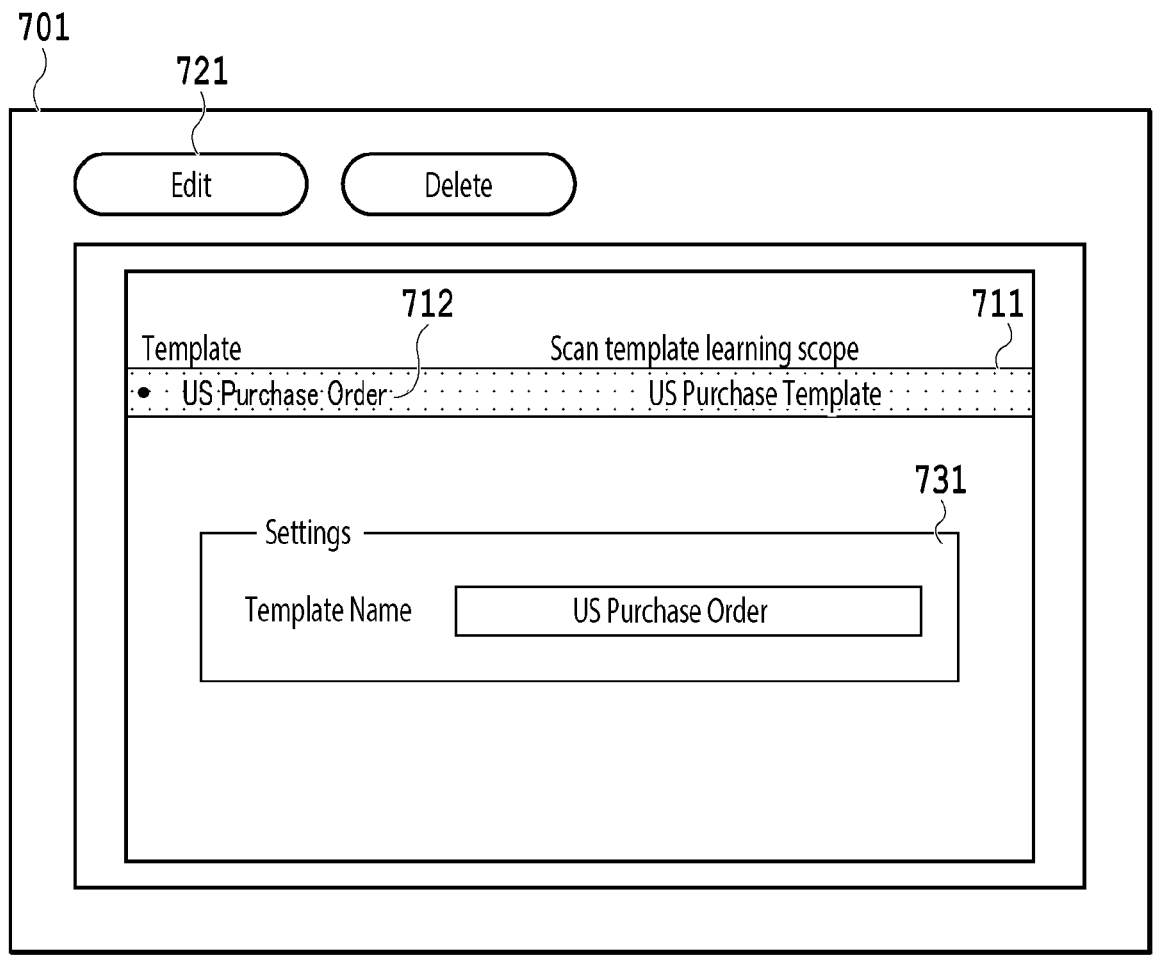
FIG. 7 is a diagram showing an example of a learning data management screen.

At S617, in the scanned document processing server 131, registration and updating of the scan setting information and/or learning data are performed as needed. For example, in a case where there exists learning data similar to the processing-target scanned image and a new OCR area is selected/set for a specific setting item, the OCR area information associated with the specific setting item in the learning data is updated. Further, for example, in a case where there exists no learning data similar to the processing-target scanned image, learning processing, such as processing to associate each setting item and a specific OCR with each other, is performed and the information is registered as new learning data. Due to this, in a case where the same type of document is processed later, the OCR area corresponding to each setting item and its recognized character string are displayed automatically on the property setting screen with referent to the learning data. Then, in this learning data, the setting information on the interpretation rule of numerical value representation is also included. FIG. 7 is an example of a UI screen for managing learning data (in the following, called "learning data management screen") and for example, the UI screen is displayed by the client application 311. On a learning data management screen 701, a highlighted area 711 shows registered learning data. The display method may be any display method, such as a list format, as long as it is possible for a user to check registered learning data. In FIG. 7, "US Purchase Order" within the area 711 is a name identifying learning data and this is set at the time of new registration. Further, it is also possible to edit this name in an editing field 731 that is displayed by pressing down an "Edit" button 721 after registration.

The above is the flow of the processing in the document management system according to the present embodiment, with the display control of the property setting screen being focused on.

<Setting of Interpretation Rule of Numerical Value Representation>

Following the above, the setting of the interpretation rule of numerical value representation is explained in detail, which is the feature of the present embodiment and which is applied in a case where numerical value information described on a business form or the like is read. FIG. 8A to FIG. 8C are each a diagram showing a specific example of numerical value representation different for different areas (countries) and languages. FIG. 8A is an example of numerical value representation found in Japan, US, UK, China and the like and as the numerical value notation representing the digit delimiter, ", (comma)" is used and as the numerical value notation representing the decimal point, ". (dot)" is used. FIG. 8B is an example of numerical value representation found in Germany, Italy, Spain and the like and as the numerical value notation representing the digit delimiter, ". (dot)" is used and as the numerical value notation representing the decimal point, ", (comma)" is used. FIG. 8C is an example of another numerical value representation and as the numerical value notation representing the digit delimiter and the decimal point, a variety of symbols are used, such as ". (dot)", "(space)", "- (hyphen)", and "' (apostrophe)".

As described above, for example, in a case where a money amount is described, a variety of numerical value representations are used in accordance with countries and languages. Then, in a case where OCR processing is performed for scanned images of business forms in a variety of countries and languages and for example, a numerical value representing "money amount" is extracted, unless the interpretation rule of numerical value representation is set appropriately, it is not possible to correctly extract the numerical value representing the money amount. As a result of that, it is no longer possible to generate property information appropriate to the scanned image.

Consequently, in the present embodiment, a user is enabled to change the setting of the interpretation rule of numerical value representation in accordance with a processing-target business form so that it is possible for the user to correctly extract a numerical value in a case where the value of each setting item for generating property information is a numerical value. Further, by learning the setting of the interpretation rule of numerical value representation in association with the processed scanned image, it is made possible to correctly extract a numerical value representing a money amount within a business form in a case of filing the same type of business form in the future and automatically input an appropriate numerical value.

FIG. 9 is a diagram explaining an example of a setting dialog used by a user to change the setting of the interpretation rule of numerical value representation. In a case where a user clicks a menu button 911 on the property setting screen, a setting dialog 921 as shown in FIG. 9 is displayed in a popup manner. The default setting in this setting dialog is the state where a checkbox 922 is not checked and at this time, the default setting of the numerical value notation representing the decimal point is ". (dot)". It is possible for a user to switch the numerical value notation representing the decimal point to ", (comma)" by checking the checkbox 922. Here, it is assumed that an OCR area 901 is designated for a setting item "Currency" in the state where the checkbox 922 is not checked as in FIG. 9 (that is, default setting). In this case, the OCR results of the OCR area 901 are interpreted that ". (dot)" is the decimal point in accordance with the default setting, and therefore, in an input field 931, a four-digit number "2150" corresponding to the money amount notation "2,150.00" in dollar is correctly input automatically. Consequently, in this case, it is not necessary to check the checkbox 922. The checkbox is an example and an arbitrary method in which, for example a radio button is used, selection is made from a list, or the like may be used.

FIG. 10 is a diagram explaining a specific example in which a user changes the setting of the interpretation rule of numerical value representation from the default setting in a case where a scanned document is a business form written in German. In FIG. 10, a user designates an OCR area 941 for the setting item "Currency". In the state before a user checks a checkbox in a setting dialog 951, the above-described default setting is applied to the OCR results for the OCR area 941. That is, by the default setting, ". (dot)" is interpreted as the decimal point and a display is produced with the figures after the decimal point being deleted. Consequently as a number corresponding to the money amount notation "2.150,00" in euro, a one-figure number "2" is input automatically. A user having detected the situation such as this displays the setting dialog 951 and checks the checkbox as shown in FIG. 10. By doing so, the setting contents of the interpretation rule of numerical value representation are changed and in the following, ", (comma)" is handled as the numerical value notation representing the decimal point. Due to this, in an input field 961, a four-digit number "2150" representing the correct money amount is input automatically. In a case where the setting is changed for the decimal point as described above, the setting of the digit delimiter is also changed at the same time. That is, in the following, ". (dot)" is handled as the numerical value notation representing the digit delimiter.

Modification Example 1

Figure 11A:
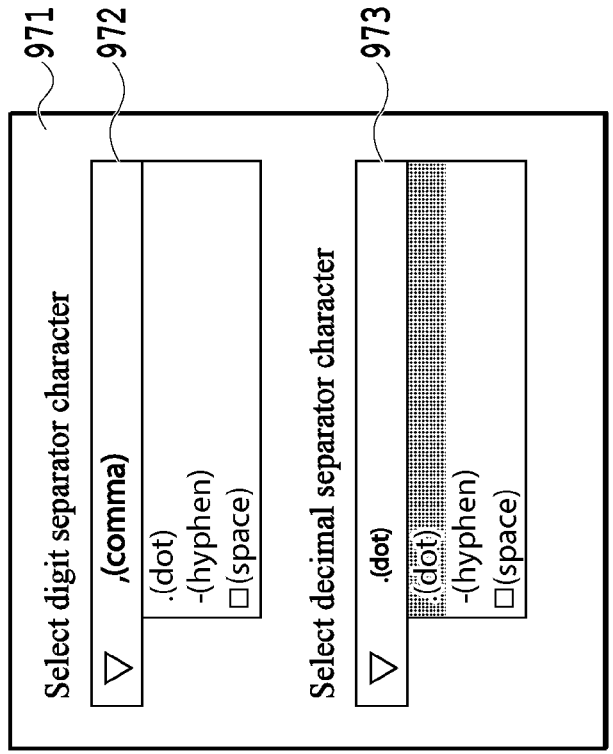
FIG. 11A and FIG. 11B are each a diagram showing a variation of the setting dialog.
Figure 11B:
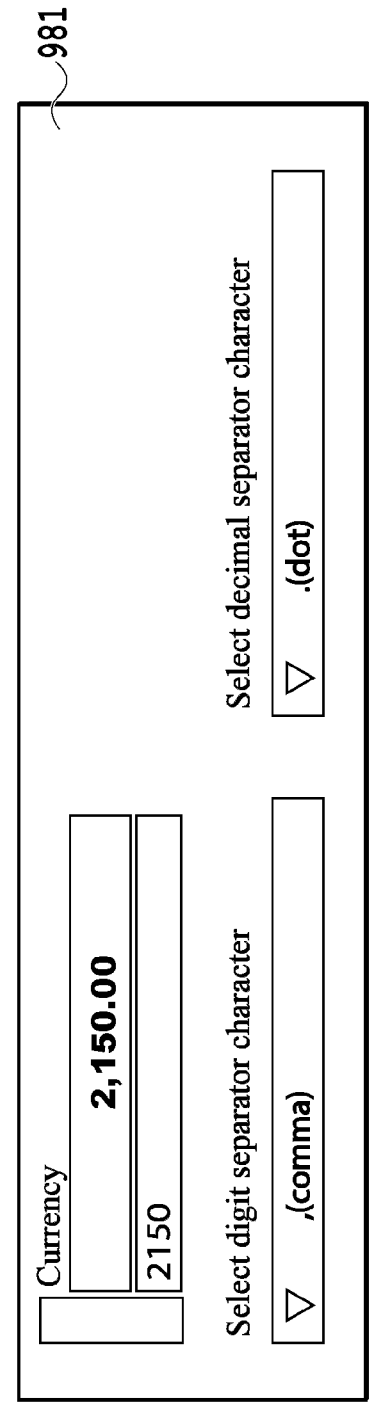
Figure 12A:
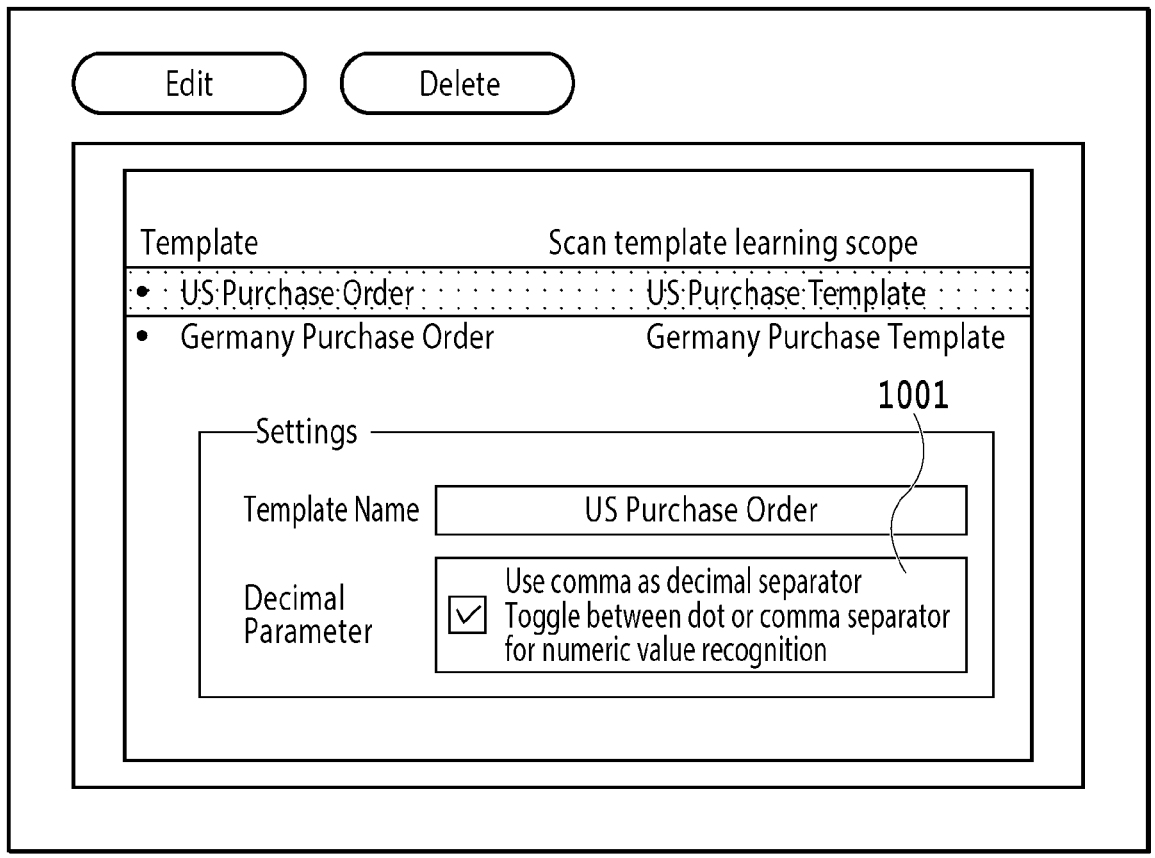
FIG. 12A and FIG. 12B are each a diagram showing an example of the learning data management screen.
Figure 12B:
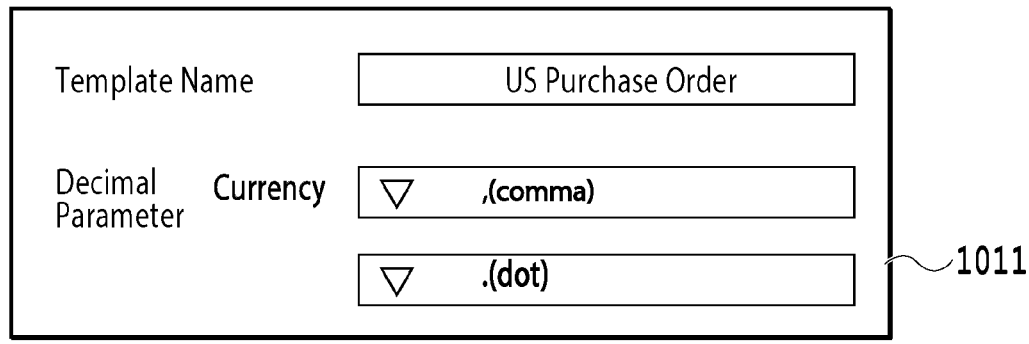

As described previously, as numerical value representation, a variety of patterns are considered, in addition to the above. Consequently, in place of the setting dialogs shown in FIG. 9 and FIG. 10, it may also be possible to employ a setting dialog, for example, as shown in FIG. 11A, in which a corresponding delimiter is selected from a plurality of candidates for each attribute, such as the digit delimiter and the decimal point. In this case, on a condition that the same delimiter is associated with different attributes, it is no longer possible to correctly recognize a numerical value. Consequently, the display control is performed so that, for example, in a case ". (dot)" is selected as the numerical value notation representing the decimal point, ". (dot)" cannot be selected for the digit delimiter, and so on. Alternatively, it may also be possible to display a warning message to the effect that the same delimiter is selected for different attributes. Further, it may also be possible to allow the selection of the same delimiter for different attributes and then perform processing to determine the delimiter that is recognized for the first time to be the decimal point in processing a character string from right to left, or processing to handle all the delimiters as the digit delimiter. Furthermore, it may also be possible to enable the setting of the numerical value notation of the digit delimiter and the decimal point for each setting item by providing the setting field for each piece of metadata, not for each scanned image, by using a setting dialog as shown in FIG. 11B. FIG. 12A and FIG. 12B are each a diagram explaining change points of the learning data management screen 701 in the case such as above. As the main change point, an input field 1001 is added in which it is possible to check and edit the setting contents of the interpretation rule of decimal point notation separate from each learning data name. The aspect of the input field 1001 may be an aspect in which, for example, the interpretation rule is set for each setting item for the decimal point and the setting contents are displayed and a user is prompted to check and edit the setting contents as in an input field 1011 shown in FIG. 12B.

Modification Example 2

Figure 13:
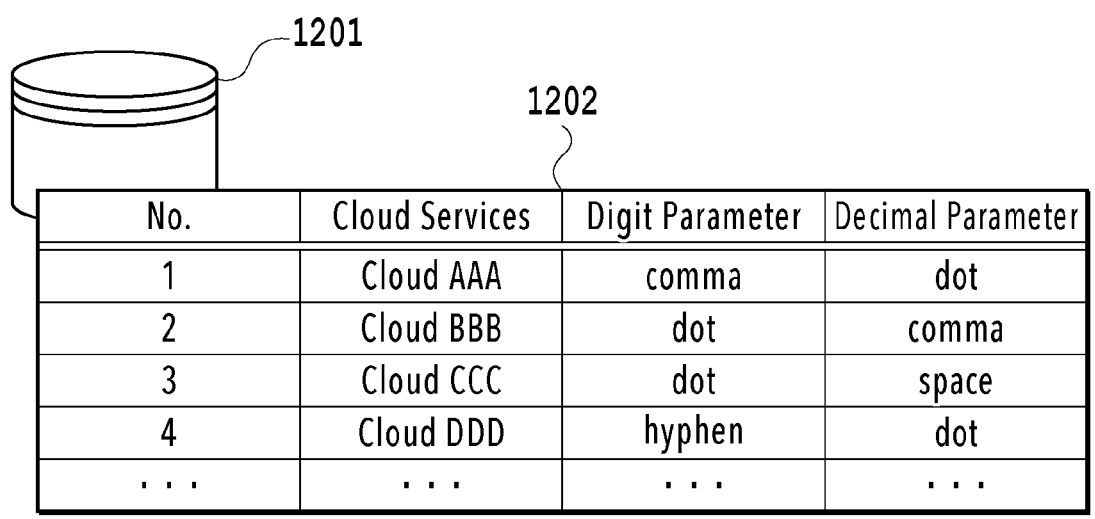
FIG. 13 is a diagram showing a DB holding the setting of the interpretation rule of numerical value representation determined for each transmission destination in a table format.

In a case where a plurality of the business servers 141 is connected to the document management system and each business server is in a pair relationship with a specific area and language, it may also be possible to perform learning by associating the setting of the interpretation rule of numerical value representation with the transmission-destination business server. Due to this, in a case where the transmission destination designated for a processing-target scanned image matches the transmission destination included in the learning data, it is possible to apply the setting of the interpretation rule of numerical value representation registered in the learning data to the processing-target scanned image. FIG. 13 shows an example of a DB (database) of learning data holding the setting of the interpretation rule of numerical value representation determined for each transmission destination in the table format. A DB 1201 is provided within the data store 341. A table 1202 manages information on the numerical value notation representing the digit delimiter and the decimal point in association with the transmission destination (for example, business server as cloud storage). Further, it may also be possible to manage the transmission destination by associating it with each sub configuration, such as a library and a folder, deployed within the cloud storage, not with each cloud storage.

As above, according to the document management system according to the present embodiment, it is possible to perform processing appropriately even in a case where the numerical value representation within a document is different for different areas (countries) and languages. Further, learning is performed with the setting of the interpretation rule of numerical value representation being included, and therefore, once learned, it is possible to omit the time an effort to change the setting of the interpretation rule of numerical value representation each time in the future in a case of the same type of document, and therefore, it is possible to reduce the burden of a user.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the document management system of the present disclosure, it is possible to process a numerical value appropriately while suppressing an increase in work burden of a user in a case where the numerical value representation within a document is different for different countries and languages.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions. This application claims the benefit of Japanese Patent Application No. 2022-080307, filed May 16, 2022, which is hereby incorporated by reference wherein in its entirety.

What is claimed is:

1. An information processing apparatus comprising:
one or more memories storing instructions; and
one or more processors executing the instructions to:
display a user interface screen for inputting property information on a scanned image; and
receive a user operation via the user interface screen, wherein
the user interface screen includes an input field to which information is input automatically based on results of character recognition processing performed for a character area included within the scanned image and
in a case where the results of the character recognition processing are a numerical value, information that is input automatically to the input field is a numerical value after the numerical value of the results of the character recognition processing is changed in accordance with a predetermined interpretation rule of numerical value representation.

2. The information processing apparatus according to claim 1, wherein
the predetermined interpretation rule predefines numerical value notation representing a decimal point.

3. The information processing apparatus according to claim 1, wherein
the predetermined interpretation rule predefines numerical value notation representing a digit delimiter.

4. The information processing apparatus according to claim 1, wherein
the predetermined interpretation rule predefines numerical value notation representing a decimal point and numerical value notation representing a digit delimiter and
contents predefined as the numerical value notation representing a decimal point and contents predefined as the numerical value notation representing a digit delimiter are different.

5. The information processing apparatus according to claim 4, wherein
it is possible for a user to set the predetermined interpretation rule via the user interface screen.

6. The information processing apparatus according to claim 5, wherein
in a case where a user sets a dot as the numerical value notation representing a decimal point, a comma is set automatically as the numerical value notation representing a digit delimiter.

7. The information processing apparatus according to claim 5, wherein
in a case where a user sets a comma as the numerical value notation representing a decimal point, a dot is set automatically as the numerical value notation representing a digit delimiter.

8. The information processing apparatus according to claim 1, wherein
the one or more processors further execute the instructions to:
determine whether learning data similar to the scanned image exists and
in a case where learning data similar to the scanned image is determined to exist, based on information on a character area associated with the learning data, a character area within the scanned image is specified and further, in a case where results of character recognition processing of the specified character area are a numerical value, the numerical value of the results of the character recognition processing is changed in accordance with a predetermined interpretation rule of numerical value representation associated with the learning data and the changed numerical value is automatically input to the input field.

9. The information processing apparatus according to claim 8, wherein
the learning data is registered in association with information on the character area and the predetermined interpretation rule.

10. The information processing apparatus according to claim 9, wherein
the one or more processors further execute the instructions to:
associate a scanned image for which the property information is set based on information input to the input field, information on the character area, and the predetermined interpretation rule with one another and register as new learning data.

11. The information processing apparatus according to claim 1, wherein
the learning data is registered in association with transmission destination information, information on the character area, and the predetermined interpretation rule and
in a case where a transmission destination of the scanned image is determined to match transmission destination information associated with learning data determined to be similar to the scanned image, based on information on a character area associated with the learning data, a character area within the scanned image is specified and further, in a case where results of character recognition processing of the specified character area are a numerical value, the numerical value of the results of the character recognition processing is changed in accordance with a predetermined interpretation rule of numerical value representation associated with the learning data and the changed numerical value is automatically input to the input field.

12. An information processing method performed by a system for inputting property information on a scanned image, the information processing method comprising:
performing character recognition processing for a character area included in the scanned image;
displaying a user interface screen for inputting property information on the scanned image; and
receiving a user operation via the user interface screen, wherein
the user interface screen includes an input field to which information is input automatically based on results of character recognition processing performed for a character area included within the scanned image and
in a case where the results of the character recognition processing are a numerical value, information that is input automatically to the input field is a numerical value after the numerical value of the results of the character recognition processing is changed in accordance with a predetermined interpretation rule of numerical value representation.

13. A non-transitory computer readable storage medium storing a program for causing a computer to perform:
displaying a user interface screen for inputting property information on a scanned image; and
receiving a user operation via the user interface screen, wherein
the user interface screen includes an input field to which information is input automatically based on results of character recognition processing performed for a character area included within the scanned image and
in a case where the results of the character recognition processing are a numerical value, information that is input automatically to the input field is a numerical value after the numerical value of the results of the character recognition processing is changed in accordance with a predetermined interpretation rule of numerical value representation.

* * * * *